March 24, 1953  W. M. RITTENHOUSE  2,632,651
POWER DRIVEN SEEDER FOR TRACTORS
Filed Nov. 28, 1947   3 Sheets-Sheet 1
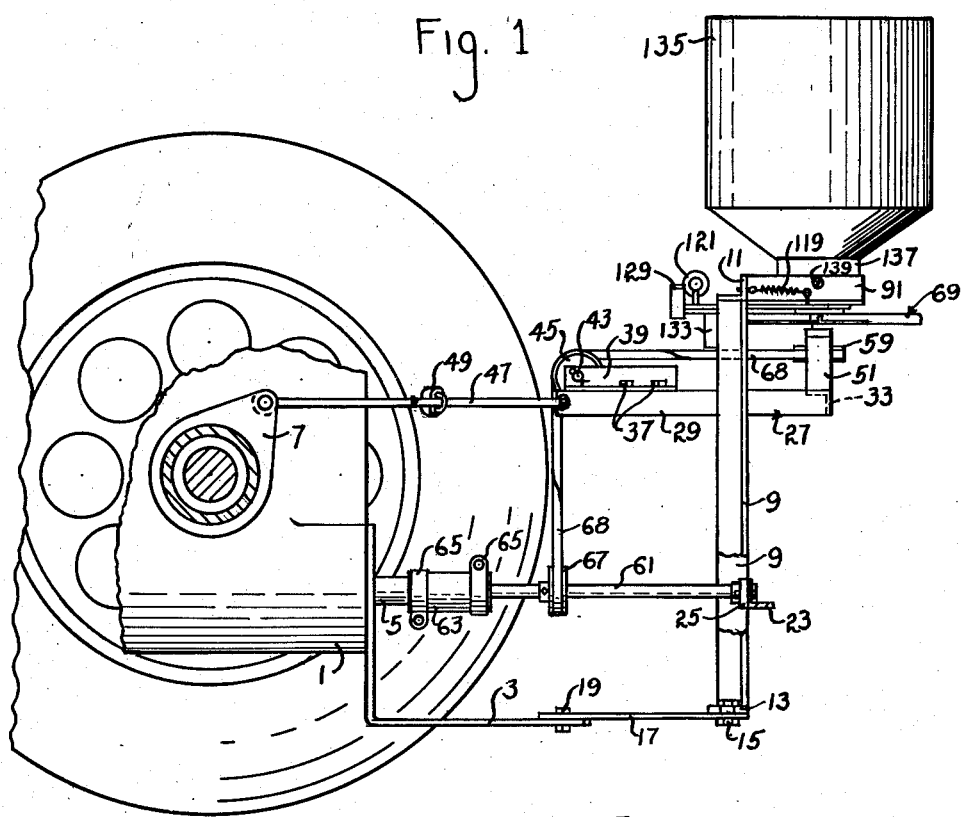
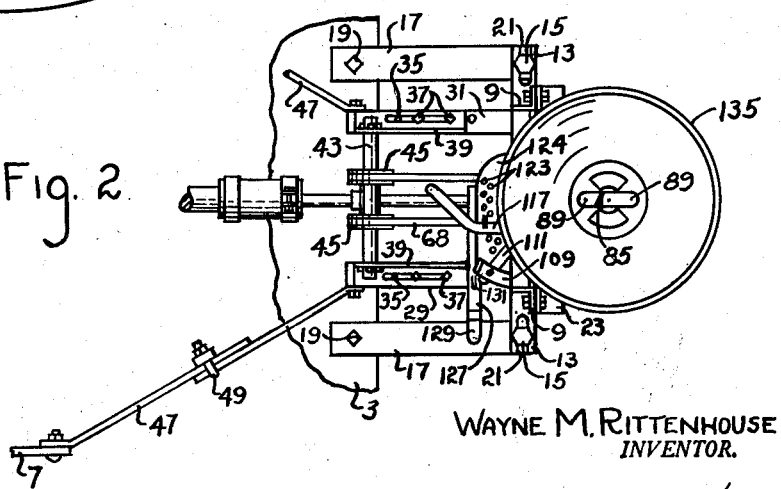
WAYNE M. RITTENHOUSE
INVENTOR.
BY Edmund W. E. Kamm
ATTORNEY

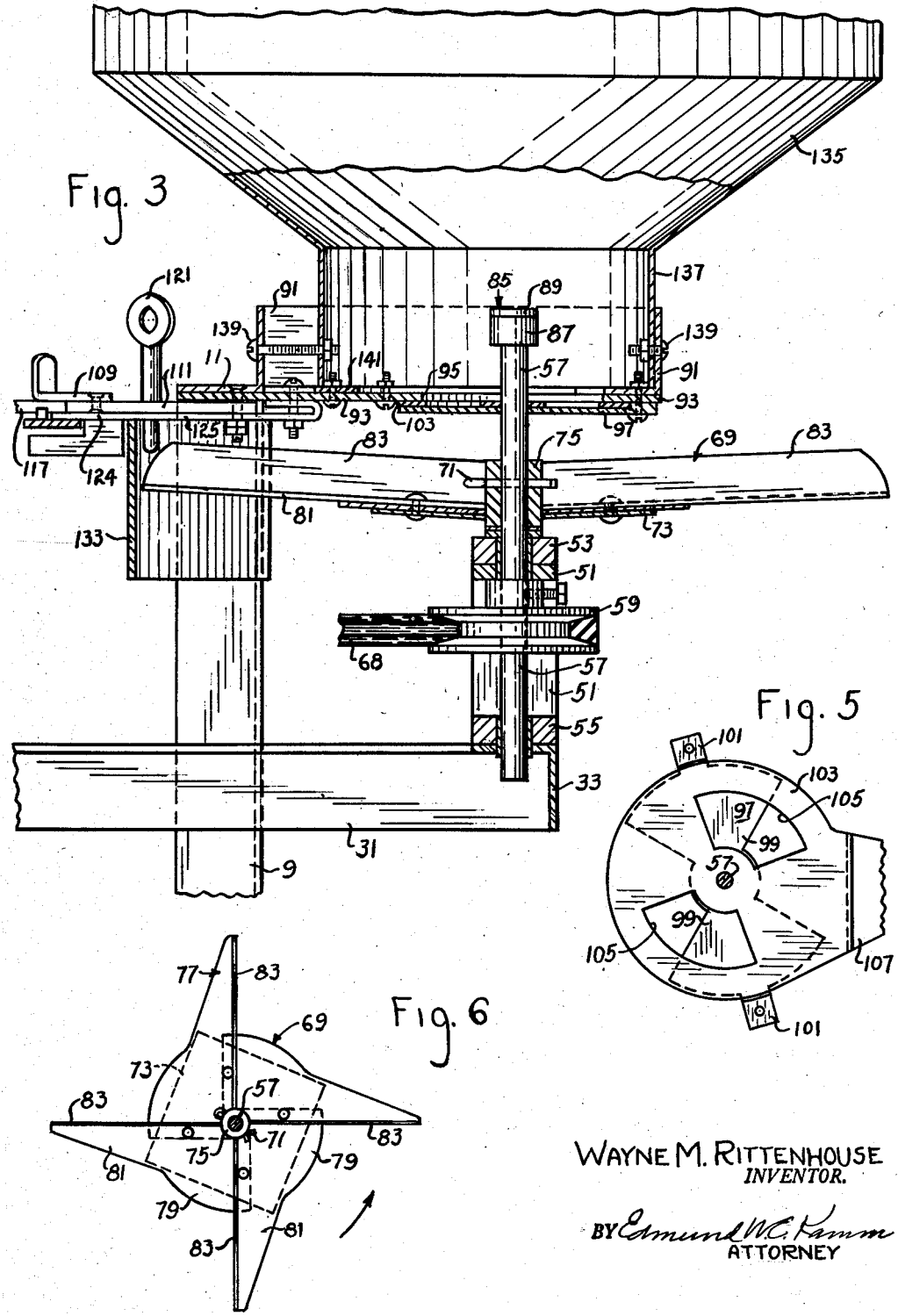

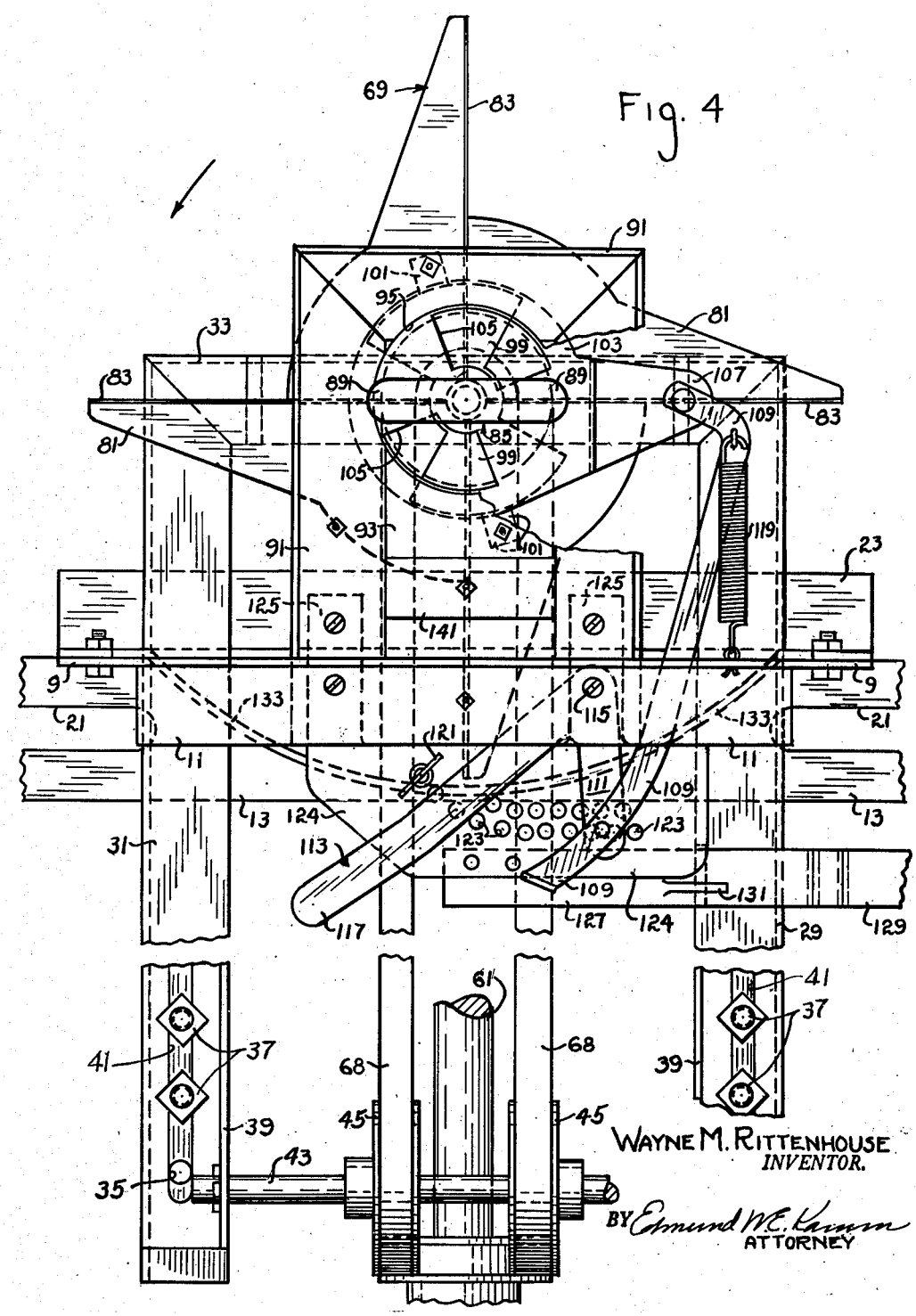

Patented Mar. 24, 1953

2,632,651

UNITED STATES PATENT OFFICE 2,632,651

POWER DRIVEN SEEDER FOR TRACTORS

Wayne M. Rittenhouse, Liberty Mills, Ind.

Application November 28, 1947, Serial No. 788,392

12 Claims. (Cl. 275—8)

This invention relates to power driven seeders for tractors. More especially, it relates to a seeding mechanism which is adapted for mounting upon the draw bar of a tractor and which is connected to be driven from the power take-off shaft.

It is an object of the invention to provide means for adjusting the size of the seed discharge openings of the mechanism.

Another object of the invention is to provide adjustable means for mounting the seeder upon the tractor.

A further object of the invention is to provide a simple but effective drive from the power take-off shaft to the seed distributor.

Yet another object of the invention is to provide a simple belt drive for the seed distributor.

It is still another object of the invention to provide adequate seed distributing means.

Still another object of the invention is to provide an economical fan construction.

A still further object of the invention is to provide a quickly settable feed mechanism.

Still another object of the invention is to provide a feed control latching mechanism.

These and other objects will become apparent from a study of this specification and the drawings which are attached hereto and made a part hereof and in which:

Figure 1 is an elevation of the seeder mounted upon a tractor, showing the drive, frame, braces and other parts.

Figure 2 is a top view of the apparatus of Figure 1.

Figure 3 is a vertical sectional view of the seeder, disclosing the fan, guard, agitator and other parts.

Figure 4 is a plan view of the apparatus with the hopper removed.

Figure 5 is a plan view of the seed gate.

Figure 6 is a plan view of the fan.

Referring now to Figure 1, the numeral 1 represents a tractor having a draw-bar 3, a power take-off 5 and support brackets 7.

The seeder frame comprises a pair of vertical angles 9 having their inner faces parallel and connected at the top by a cross angle which is welded thereto, and numbered 11. A support bar 13 is welded to and spans the lower ends of the angles 9. The bar projects beyond the angles and is slotted at 21 to receive bolts 15 which hold the frame upon mounting plates 17 which are in turn mounted upon the draw-bar 3 by means of bolts 19. A cross member 23 is welded at each end to one of the angles 9 and supports near its center, a self-aligning bearing 25.

A sub-frame 27 comprises two horizontal angles welded, one to each member 9 and connected at the rear by an angle, said angles being numbered 29, 31 and 33, respectively.

The forward ends of angles 29 and 31 have a plurality of spaced perforations 35 therein for the reception of bolts 37 which hold the bearing angles 39 in adjusted position thereon. The angles 39 are slotted as at 41 to permit adjustment thereof along the angles 29 and 31.

The upstanding flanges of the angles 39 are perforated to receive the shaft 43 rotatably therein. A pair of pulleys 45 are rotatably mounted upon the shaft and are capable of movement axially of the shaft so that they are self-aligning as will be described.

Brace rods 47 connect the forward ends of the angles 29 and 31 to the brackets 7 of the tractor. The rods are in two parts which are held together with U-clamps 49 so that they may be extended or retracted as required.

An inverted U-shaped bracket 51 has its ends welded to the angle 33 of the sub-frame and supports a bearing 53. A similar bearing 55 is fixed on the member 33. A rotatable shaft 57 is mounted vertically in these bearings and carries fixed thereto, a pulley 59.

A shaft 61 has one end supported in bearing 25 and the other end connected to the shaft 5 preferably by means of the hose 63 and clamps 65. A pulley 67 is fixed to the shaft 61 and a belt 68 runs from this pulley, over pulleys 45 and 59 to transmit power from shaft 5 to shaft 57. The tension of the belt may be readily adjusted by adjusting the angles 39 and pulley 67 as required. Various lengths of belt may thus be used.

A fan 69 is attached to shaft 57 above bearing 53 as by a pin 71 so as to rotate therewith. The fan comprises a square plate 73 having a hub 75 fixed thereto. A plurality of fan blades 77 are riveted to the plate. The blades are in the form of a quadrant 79 which intersects with a radially disposed triangle 81. A vertical flange 83 extends along the altitude of the triangle.

An agitator 85 has a hub 87 which is mounted upon the upper end of shaft 57 and comprises two radial arms 89.

A U-shaped frame 91 made of angles welded together with the flanges upward, has its ends welded to the angle 11 as seen particularly in Figures 3 and 4. A bottom plate 93 is fixed to the frame 91 and has a circular opening 95 formed therein.

A port plate 97, having two fan-shaped baffles 99, is mounted in spaced relation below the plate 93 by means of tabs 101 and screws which enter the plate 93. The hub of the plate has an opening through which shaft 57 passes.

A gate 103 is pivoted on the shaft 57, between the bottom plate 93 and the port plate 97. The gate has port openings 105 which are sector shaped. A lever 107 extends laterally therefrom and is pivotally connected to a link 109 which extends forwardly and is pivotally connected to an arm 111 of a bell crank lever 113 which is, in turn, pivoted at 115 to angle 11. The other arm 117 of the bell crank serves as the operating arm. A spring 119 connected between the link 109 and angle 11 holds the gate in its farthest clockwise position which is determined by pin 121 which enters one of a plurality of holes 123 in the pin plate 124 which is supported upon arms 125 extending under and fixed to bottom plate 93.

A latch arm 127 is mounted adjacent the front edge and underneath the pin plate. It projects beyond one side thereof and is bent upwardly to form a grip 129. The upper surface of the arm carries a latching lug 131 which is adapted to engage arm 117 of bell crank 113 and hold it against the action of spring 119. When the arm is held by the lug, the gate is in position to close the ports 105.

Numeral 133 represents a baffle which is in the form of a curved plate with its ends fixed to the angles 9 in the region of the fan.

A seed hopper 135 is formed with a neck 137 which fits within the frame 91 and is held therein by suitable bolts 139. A filler strip 141 extends between the angles of the frame 91 to support the forward edge of the neck.

The seed feeding organization comprising the hopper, gate, fan and gate control mechanism is referred to generally herein as the "feeder."

*Operation*

The apparatus is mounted upon the tractor by bolting the mounting plates 17 on the draw-bar and the support bar 13 on the plates. In the case of some tractors the plates 17 may be omitted and the bar 13 bolted directly upon the draw-bar.

The shaft 61 is connected to the power take-off shaft 5 by telescoping the hose 63 over the shafts and tightening the clamps 65. The frame should be shifted to secure the best alignment of the shafts possible.

The pulley 67 and the bearing angles 39 are then adjusted, if necessary, to secure the proper belt tension. The elongated slots in the angles permit substantial adjustment which, if it is not sufficient can be amplified by moving the bolts to a different set of holes in the angles 29, 31.

Next the pin 121 is inserted in the proper hole 123 for the seed and the quantity to be sown per acre. The holes at the right, Figure 4, represent small openings in the ports 105 while those on the left represent large openings of the ports. The size of the seeds and the quantity to be sown governs the hole selected. If desired, the holes may be numbered so that they may be specified in a table.

When it is desired to sow the seed, the tractor is positioned for the first run and the grip 129 is depressed. This withdraws the lug 131 from arm 117 and spring 109 will rotate the arms 107, 111 and 117 clockwise, Figure 4, and open the ports 105 to the degree permitted by the pin 121 which stops the arm 117.

The agitator 85 rotates in the neck 137 of the hopper and keeps the seed flowing down from the hopper into the neck and out through the ports whence it falls upon the fan. It will be seen that one port 105 is located at the rear of the hopper and the other at the front. The seed falling from the rear port is distributed to the rear left and right, Figure 4, while that from the front port is distributed to the right and rear right. The baffle 133 causes any seed which is carried, thrown or blown forwardly to be stopped and the same will fall downwardly.

The flanges 83 on the blades, of course, hold the seed on the blade so that it can leave only radially and will thus be scattered by the blade. The blades are also tilted slightly upwardly and outwardly so as to retain the seed to some extent when the fan is operating so that it will spread evenly.

When the end of a row is reached, the operator need merely throw the lever 117 to the right, Figure 4, until the lug 131 engages it. After the tractor is turned and another run is started, the handle 129 is again depressed and the ports 105 are reopened by the spring as previously explained.

While I have disclosed one form of my invention for purposes of illustration, it is obvious that various changes may be made in the size, proportions, form and arrangement of parts without departing from the spirit of the invention. I, therefore, do not desire to be limited to the exact form disclosed herein but desire protection falling fairly within the scope of the appended claims.

What I claim to be new and desire to cover by Letters Patent of the United States of America is:

1. In a seeder for a tractor having a draw-bar and a power shaft, the combination of a frame, a rigid, driven shaft rotatably mounted at one end on said frame, seed feeding means, including rotatable means, mounted on said frame, means connecting said rotatable means to be driven by said rigid shaft, flexible tubing means for connecting the other end of said driven shaft to be supported and driven by the power shaft and means for mounting said frame on said draw-bar to position the shafts substantially in a common plane, said latter means being adjustable to align said shafts.

2. In a seeder for a tractor having a draw-bar and a power shaft, the combination of a frame, a driven shaft slidably mounted at one end in a self-aligning bearing on the frame, seed feeding means, including rotatable means, mounted on the frame, means connecting said shaft to drive said rotatable means, flexible means connecting said power shaft and the other end of said driven shaft in supporting and driving relation, two bars, each pivotally mounted at one end on the draw-bar and connected at the other end to the frame whereby said frame is shiftable parallel to the draw-bar to align the shafts.

3. In a seeder for a tractor having a draw bar and a power shaft, the combination of a frame, a rigid driven shaft slidably mounted at one end in a self-aligning bearing on the frame, seed feeding means, including rotatable means, mounted on the frame, a belt connecting said shaft to drive the rotatable means, means mounting said frame on the draw-bar and a resilient tube and clamps for drivingly connecting said shafts and to support the other end of said driven shaft.

4. In a power seeder, the combination of a frame, a bearing thereon, a driven shaft slidably and rotatably mounted in the bearing, a feeder, including rotatable means, mounted on the frame, a sub-frame slidably disposed on the frame for movement substantially parallel to the shaft, a shaft mounted transversely thereon, pulleys on the shafts and rotatable means and a belt connecting the pulleys.

5. In a power seeder, the combination of a frame, a feeder, including rotatable means, mounted on the frame, a power shaft mounted substantially horizontally in a self-aligning bearing on the frame, a vertical shaft driving the rotatable means, said shafts being in a common plane, an idler shaft, means on the frame mounted for adjustment substantially parallel to the power shaft and having bearings adapted to support the idler shaft substantially perpendicular to the plane, pulleys fixed to the power and feeder shafts, additional pulleys freely mounted on the idler shaft and a belt connecting said first named pulleys and running over the last named ones.

6. The apparatus claimed in claim 5 wherein the power shaft pulley is adjustable axially of the power shaft.

7. In a power seeder, the combination of a frame, an upwardly open receptacle thereon, a hopper mounted in the receptacle, a relatively movable means forming feed ports in the receptacle, said ports being variable in size as said means are moved, a fan disposed under the ports and having a central axis, said ports being disposed on opposite sides of said axis, the common axes of said ports being disposed at an angle to the direction of movement of the seeder and displaced therefrom through an angle measured in a direction opposite to the direction of rotation of the fan, the movable port forming means, when moved to open the port, serving to enlarge the ports in a direction opposite to the rotation of the fan to increase the width of the area to which seed is distributed, transversely of the direction of motion of the seeder, a power shaft on the frame and means connecting the shaft to drive the fan.

8. In a power seeder, the combination of a frame, an upwardly open receptacle thereon, a hopper mounted in the receptacle, a port plate, a gate having ports therein, said gate and plate being relatively movable to vary the size of the ports, a fan disposed under the ports and having a central axis, said ports being disposed on opposite sides of said axis, means for driving the fan, said movable one of said gate and plate being movable in a direction opposite to the rotation of said fan to increase the area covered by the seed, said ports being disposed in diametrically opposed position with respect to said axis and on opposite sides of the line of motion of the seeder passing through said axis and displaced therefrom in a direction opposite the direction of motion of said fan, and means normally urging said gate and plate to port open position.

9. In a seeder, the combination of a frame, a hopper mounted on the frame, a gate having ports formed therein, a port plate, said gate and plate being mounted for relative movement to open, close and regulate the size of the ports, a lever connected to effect such relative movement, resilient means urging the lever to port open position, adjustable stop means for limiting the movement of said lever under the action of said resilient means and means for latching said lever in position to close the ports.

10. In a seeder, the combination of a frame, a hopper mounted on the frame, a gate having ports formed therein, a port plate, said gate and plate being mounted for relative movement to open, close and regulate the size of the ports, a lever connected to effect such relative movement, resilient means urging the lever to port open position, adjustable stop means for limiting the movement of said lever under the action of said resilient means and a yieldable latch for holding the lever in port closed position.

11. In a seeder, the combination of a frame, a hopper mounted thereon, seed feeding ports in the hopper, means for opening, closing and adjusting the effective size of the ports comprising a port plate movable between port open and port closed positions, a lever, means connecting the lever to actuate the port plate, a spring connected to urge said lever toward port open position, a pin plate mounted on the frame and having a plurality of spaced openings therein and a stop pin adapted to enter a selected opening to limit the movement of the lever induced by the spring.

12. In a seeder, the combination of a frame, a hopper mounted thereon, seed feeding ports in the hopper, means for opening, closing and adjusting the effective size of the ports comprising a port plate movable between port open and port closed positions, a lever, means connecting the lever to actuate the port plate, a spring connected to urge the lever toward port open position, a pin plate mounted on the frame and having a plurality of spaced openings therein, a stop pin adapted to enter a selected opening to limit the movement of the lever induced by the spring and a latch for holding the lever in port closing position.

WAYNE M. RITTENHOUSE.

REFERENCES CITED

The following references are of record in the file of this patent:

UNITED STATES PATENTS

| Number | Name | Date |
|---|---|---|
| 1,172,005 | Butterfield | Feb. 15, 1916 |
| 1,625,353 | Dugan | Apr. 19, 1927 |
| 1,751,928 | Lachner | Mar. 25, 1930 |
| 1,886,140 | Welty | Nov. 1, 1932 |
| 2,065,361 | Blake | Dec. 22, 1936 |
| 2,245,152 | Masters | June 10, 1941 |
| 2,334,376 | Bauer | Nov. 16, 1943 |
| 2,463,855 | Crawford | Mar. 8, 1949 |
| 2,519,243 | Gjertson | Aug. 15, 1950 |